(12) United States Patent
Chen

(10) Patent No.: US 9,574,694 B2
(45) Date of Patent: Feb. 21, 2017

(54) PIPE FREEZER SYSTEM

(71) Applicant: Spectronics Corporation, Westbury, NY (US)

(72) Inventor: Limin Chen, Dix Hills, NY (US)

(73) Assignee: Spectronics Corporation, Westbury, NY (US)

(*) Notice: Subject to any disclaimer, the term of this patent is extended or adjusted under 35 U.S.C. 154(b) by 278 days.

(21) Appl. No.: 14/456,502

(22) Filed: Aug. 11, 2014

(65) Prior Publication Data

US 2016/0040818 A1 Feb. 11, 2016

(51) Int. Cl.
*F25C 1/22* (2006.01)
*F16L 55/103* (2006.01)

(52) U.S. Cl.
CPC ................. *F16L 55/103* (2013.01)

(58) Field of Classification Search
CPC .............. F25C 1/04; F25C 1/225; F25B 39/02
USPC .......................... 62/340, 478, 486, 515, 524
See application file for complete search history.

(56) References Cited

U.S. PATENT DOCUMENTS

| 4,267,699 A | * | 5/1981 | Bahrenburg | ........... F16L 55/103 138/89 |
| 4,492,095 A | * | 1/1985 | Brister | ..................... F16K 7/10 137/13 |
| 4,944,161 A | * | 7/1990 | Van Der Sanden | ...... F25D 3/10 138/97 |
| 5,548,965 A | * | 8/1996 | Chen | ..................... F16L 55/103 137/13 |
| 5,836,167 A | | 11/1998 | Clouston et al. | |
| 6,598,412 B1 | | 7/2003 | Chen | |

FOREIGN PATENT DOCUMENTS

| DE | 19536494 A1 | 4/1997 |
| DE | 19710566 A1 | 1/1998 |
| EP | 0736721 A1 | 10/1996 |
| WO | 8901110 A1 | 2/1989 |

OTHER PUBLICATIONS

Extended Search Report/Search Opinion, EP 15164146.1 (Dec. 14, 2015).

* cited by examiner

*Primary Examiner* — Melvin Jones
(74) *Attorney, Agent, or Firm* — Drinker Biddle & Reath LLP

(57) ABSTRACT

An evaporator cuff for use with a pipe freezer apparatus. The evaporator cuff includes a hose connector attached to an evaporator body. The evaporator body has an inner wall configured to engage the outer surface of a pipe, an outer wall spaced apart from the inner wall. A chamber is defined between the inner and outer walls, first and second side walls, and first and second end walls. A plurality of baffles are located in the chamber and arranged to define a series of conduits for creating a flow path through the chamber for refrigerant to flow along. The walls are arranged so as to form a serpentine flow path from the evaporator inlet to the evaporator outlet.

13 Claims, 8 Drawing Sheets

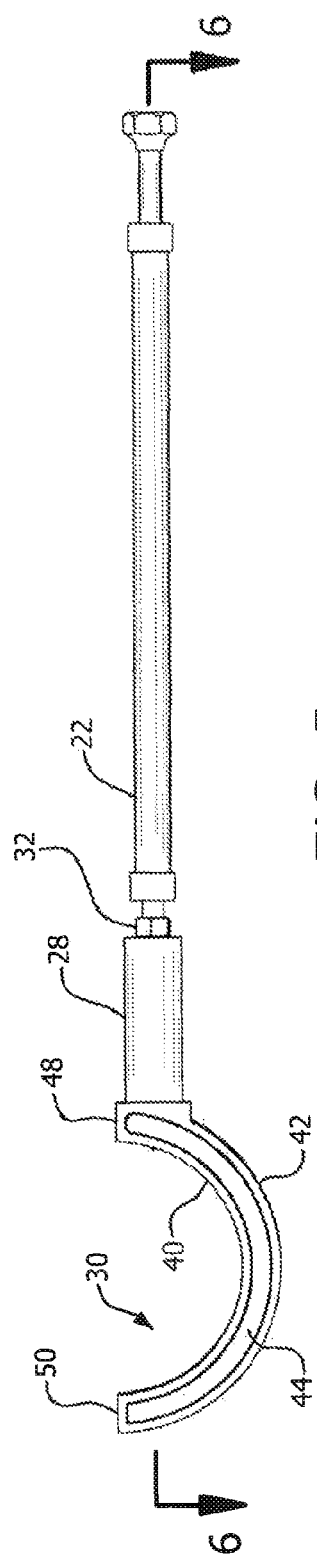
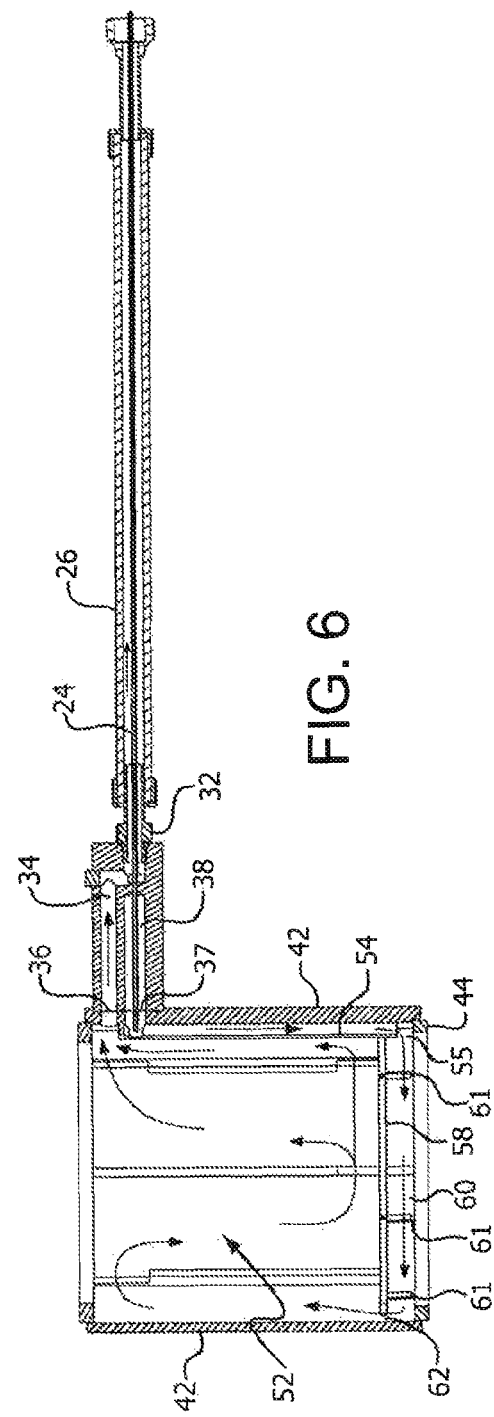
FIG. 5
FIG. 6

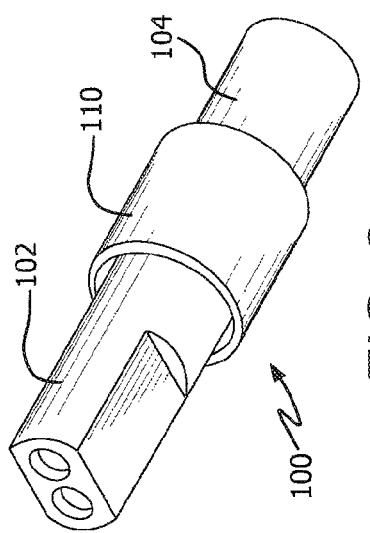
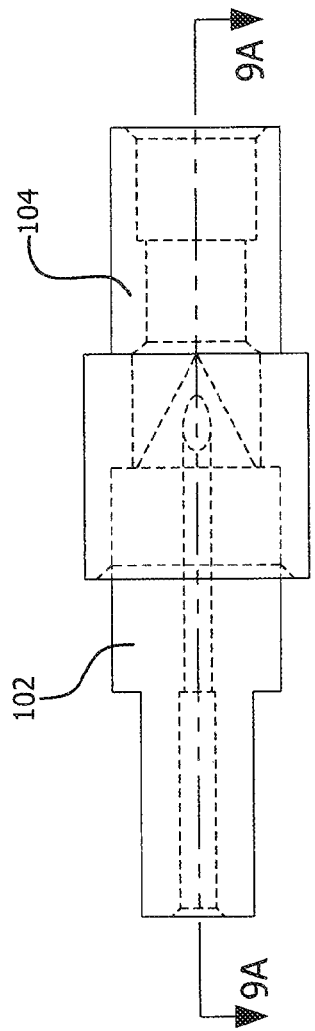
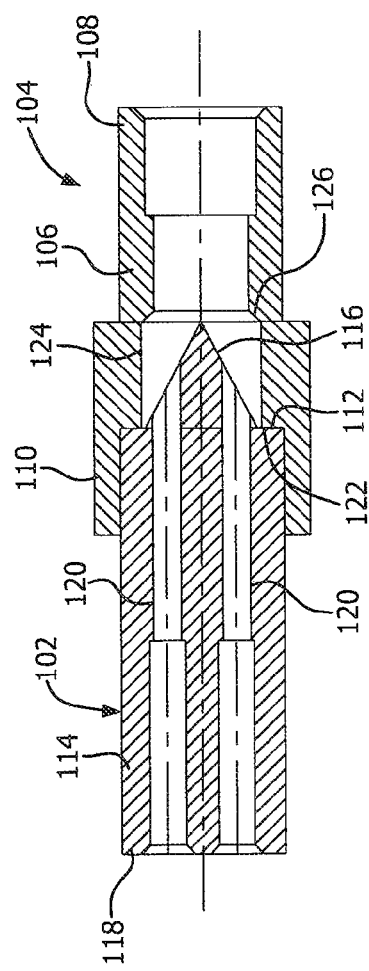

PIPE FREEZER SYSTEM

FIELD OF THE INVENTION

This invention relates generally to a system for freezing the liquid contents of pipes to permit work on the pipe and, more particularly to a portable pipe freezer system that is designed to effectively freeze liquid in large diameter pipes.

BACKGROUND OF THE INVENTION

Pipe freezers are used in the repair or replacement of pipe sections or for repairing or adding fittings to existing pipe installations. Such systems are primarily used in fluid systems where it is not convenient or not readily possible to drain fluid in the pipe installation. By freezing the fluid in the pipe, it is possible to block the fluid in the section of pipe of interest by creating an ice plug.

U.S. Pat. Nos. 5,548,965 and 6,598,412, which are assigned to the assignee of the current invention, use a refrigeration system with evaporator heads or adapters that are sized to fit various standard pipe diameters. The evaporator heads are connected to a portable condenser/compressor unit by flexible coaxial tubes that cycles refrigerant to and from the evaporation chambers. The refrigerant causes the evaporator heads to freeze the pipe where they are in contact.

Although the above patents provide different size openings in the evaporator head to fit different size standard pipes, the systems disclosed therein were not capable of handling pipe diameters of four inches or larger (i.e., large diameter pipes) since the volume of water in such large diameter pipes did not allow for a sufficient removal of heat energy to cause freezing of the liquid.

For example, it has been determined that in order to freeze a four inch diameter pipe sufficiently to create and maintain an ice plug, a temperature of −55 degrees F. must be applied to the pipe. Conventional portable condensers are not capable of creating such a low temperature consistently. So instead, prior systems had to revert to two stage cooling systems, where a first cooling system is used to cool the system fluid, and a second cooling system is used to cool the first system. Because of the high costs of such systems, conventional systems generally rely on the use of liquid nitrogen, compressed air with vortex tubes, or $CO_2$. However, those systems are difficult to use and costly.

A need therefore exists for an improved system for cooling large diameter pipes having a diameter of about four inches or more.

SUMMARY OF THE INVENTION

The present invention relates to an evaporator cuff for use with a pipe freezer apparatus to freeze a large diameter pipe. The evaporator cuff includes a hose connector with a first cavity and a return channel. An evaporator body is attached to the hose connector and includes an inner wall having a contour that defines a portion of a cylinder and is configured to engage the outer surface of a pipe. The body also includes an outer wall that is spaced apart from the inner wall and is connected to the inner wall through first and second side walls, and first and second end walls, defining a chamber therebetween. An evaporator inlet is formed in the evaporator body and is in fluid communication with the first cavity of the hose connector. An evaporator outlet is formed in the evaporator body and is in fluid communication with the return channel of the hose connector. A plurality of baffles are disposed in the chamber and arranged to define a series of conduits for creating a flow path through the chamber for refrigerant to flow along. The baffles are arranged so as to form a serpentine flow path from the evaporator inlet to the evaporator outlet.

In an embodiment, the plurality of baffles include a first baffle formed between the inner wall and the outer wall and attached to the end wall, the first baffle defines a first conduit from the evaporator inlet in a direction away from the evaporator outlet so as to inhibit refrigerant entering the first conduit from passing directly into the evaporator outlet. The first baffle extends toward the first side wall and defines a first opening for providing a passage for refrigerant to flow out of the first conduit.

A second baffle may be located inward from the first side wall and extends from the first baffle the second end wall. The second baffle defines a second conduit that extends along the front of the evaporator to the opposite side of the evaporator chamber from the evaporator inlet. The second baffle has a second opening to allow refrigerant to flow out of the second conduit.

A third baffle is located inward from the second end wall and extends away from the second baffle and toward the second side wall so as to define a third conduit. The third baffle has a third opening to allow refrigerant to flow out of the third conduit.

A fourth baffle may be formed in the chamber and spaced apart from the third baffle so as to define a fourth conduit. The fourth baffle extends from the second side wall toward the second baffle. The fourth baffle includes a fourth opening to allow refrigerant to flow out of the fourth conduit. A fifth baffle may be formed in the chamber and spaced apart from the fourth baffle so as to define a fifth conduit. The fifth baffle extends from the second baffle toward the second side wall. The fifth baffle includes a fifth opening that allows refrigerant to flow out of the fifth conduit.

The fifth baffle may also include a sixth opening at or near the second baffle for providing a passage for refrigerant to flow out of the fifth conduit and toward the evaporator outlet.

The fifth baffle may be spaced apart from the first baffle so as to define a sixth conduit for the refrigerant to flow from the sixth opening toward the evaporator outlet.

A pipe freezer apparatus is also disclosed that incorporates the cuff described above.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 5 is a side view of the evaporator of FIG. 2.

FIG. 6 is a cross-sectional view of the evaporator taken along lines 6-6 of FIG. 5.

FIG. 8 is an isometric view of a flow distributor for use in a pipe freezer apparatus.

FIG. 9 is a side view of the flow distributor of FIG. 8.

FIG. 9A is cross-sectional view of the flow distributor taken along lines 9A-9A in FIG. 9.

DETAILED DESCRIPTION OF EMBODIMENTS

Figure 1:
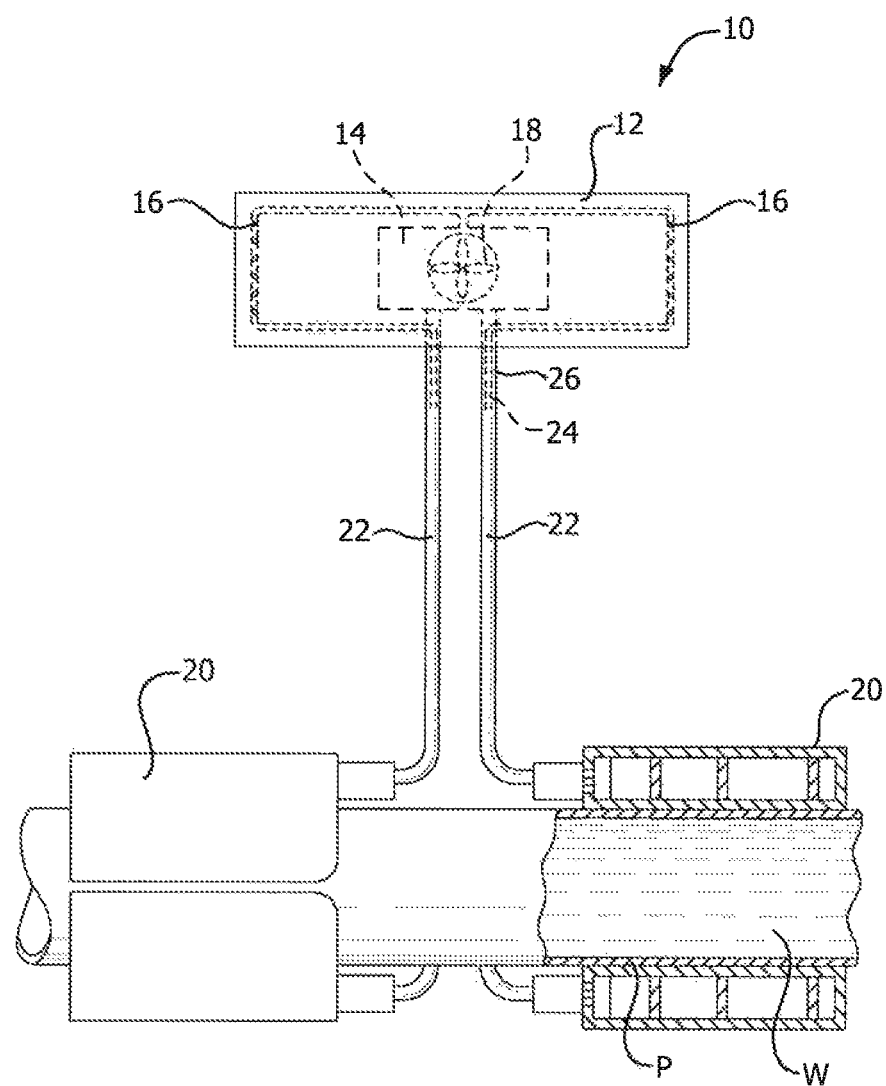
FIG. 1 is a schematic view of a pipe freezer system according to an embodiment of the invention.
Figure 2:
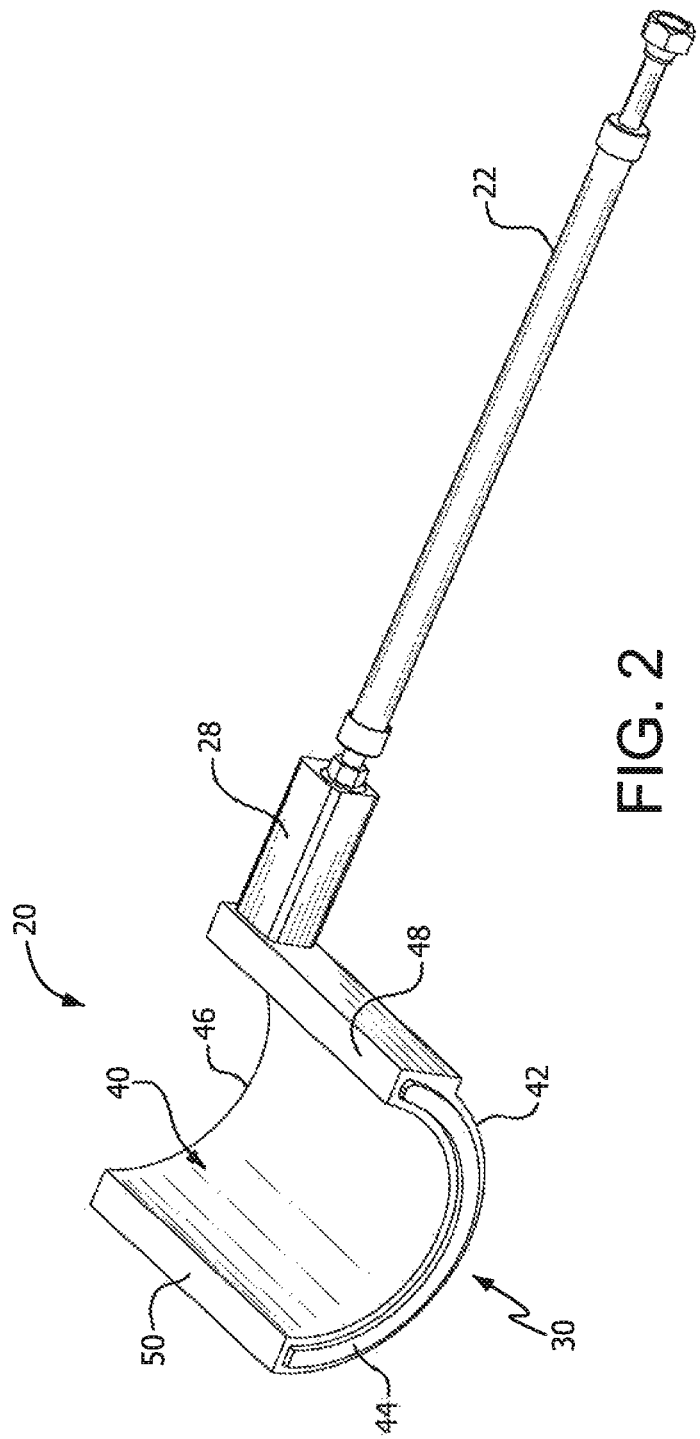
FIG. 2 is a perspective view of a partial cylindrical evaporator for use in the system of FIG. 1.

Referring now to the figures wherein like reference numerals indicate similar elements throughout the figures, an embodiment of a pipe freezer system 10 is shown for use in freezing large diameter pipes. The system 10 is shown installed on a pipe P to freeze the water W inside a section of pipe so as to form an ice plug. The system includes a condenser/compressor unit 12 that includes, in an embodiment, a compressor 14, a condenser 16, and one or more fans 18. The condenser/compressor unit 12 may also include a filter drier (not shown) positioned downstream from the condenser 16. The condenser/compressor unit 12 is preferably a portable unit. The system 10 includes one or more evaporator cuffs 20, each connected to the condenser/compressor unit by one or more hoses 22. In an embodiment, the hose 22 is a flexible coaxial hose. Preferably there are two or more cuffs configured so as to, when attached to a pipe, surround substantially the entire circumference of the pipe. The cuffs could be hinged together or separately mounted around the pipe. The coaxial hose includes an inner tube 24 and an outer tube 26. The inner tube 24 is a capillary tube that is configured to reduce the pressure of the refrigerant flowing through it. The entrance of the tube received a flow of high pressure refrigerant from the condenser/compressor unit 12. At its output end, the inner tube 22 delivers the flow of liquid refrigerant at low pressure and low temperature to the evaporator cuffs 20. The outer tube 26 returns refrigerant vapor from the evaporator cuffs 20 to the condenser/compressor unit 12. The compressor used in an embodiment is a horizontal rotary vane design produces a desirable low temperature. However, suitable compressor could be used in the system. It should be readily apparent that, instead of a coaxial hose 22, separate tubes 24, 26 could be used.

Figure 3:
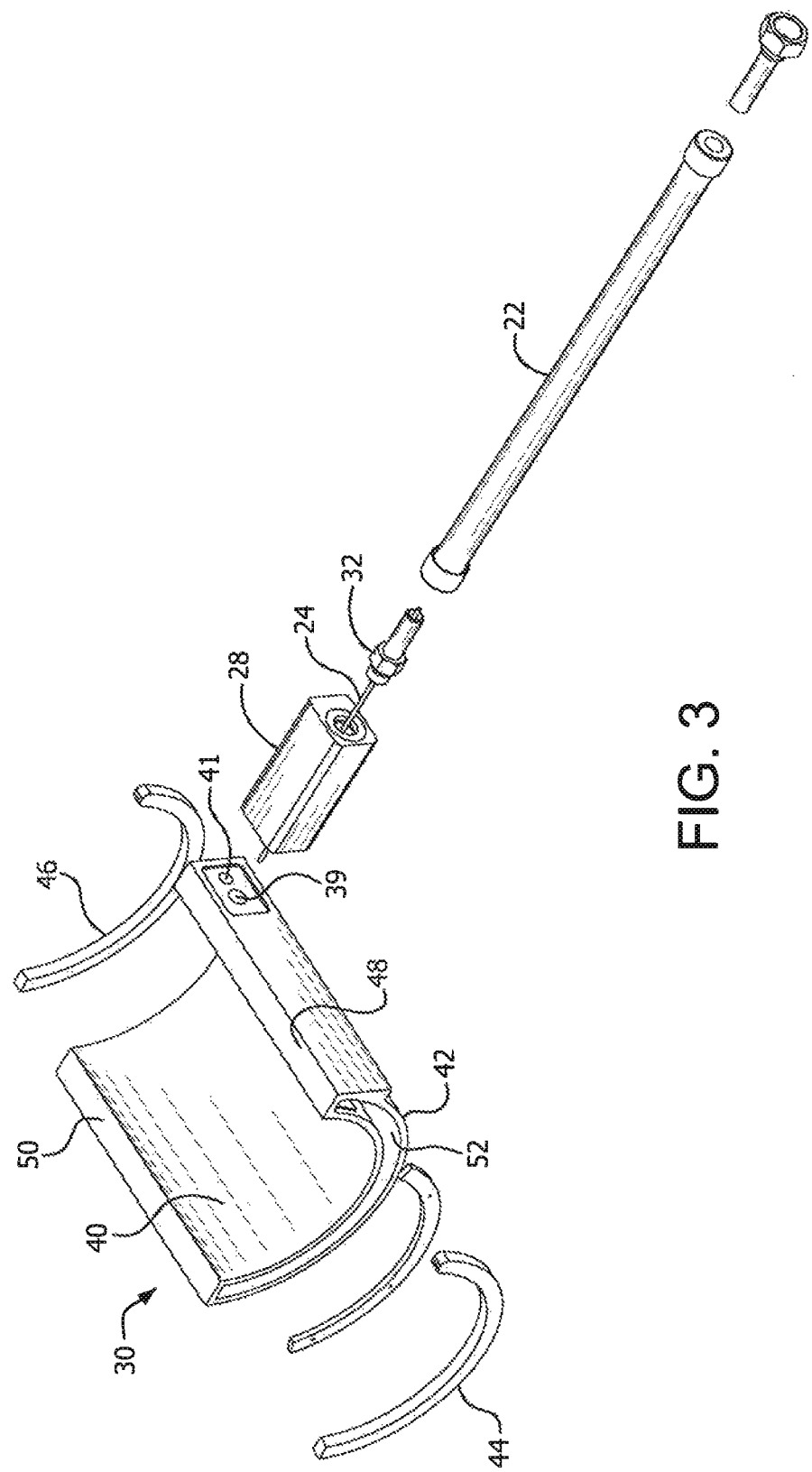
FIG. 3 is an exploded view of the evaporator of FIG. 2.
Figure 4:
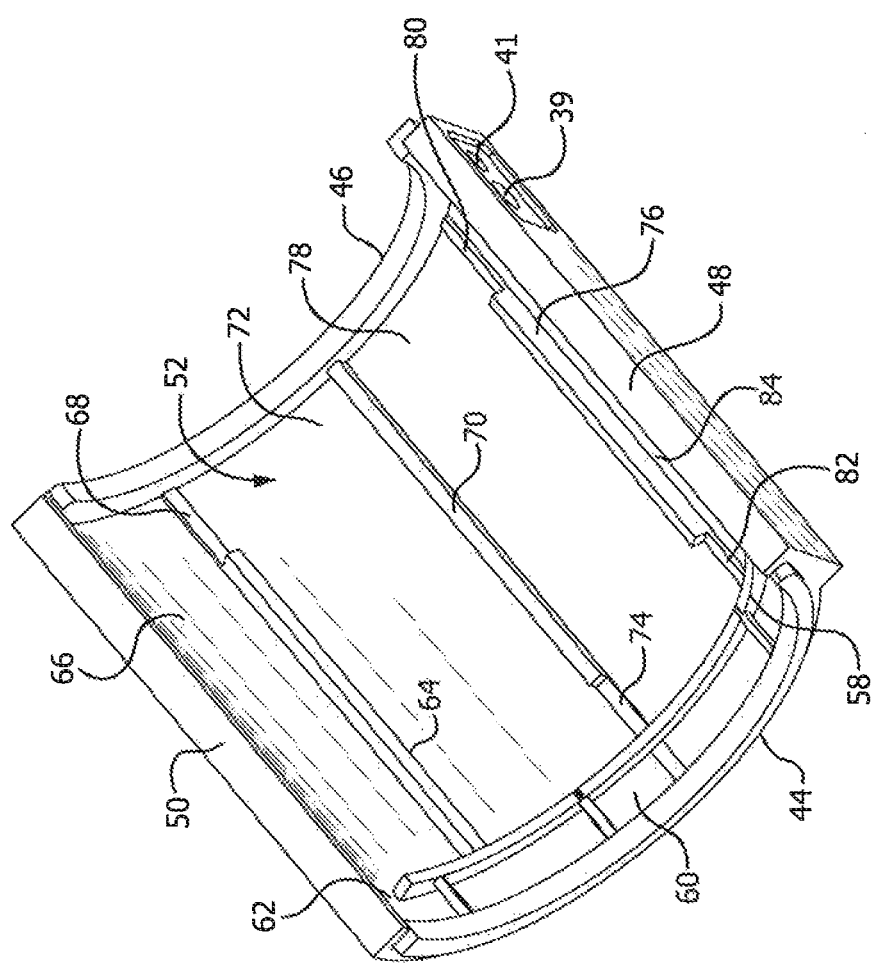
FIG. 4 is a perspective view of the evaporator head of FIG. 2 with the inner wall removed.
Figure 7:
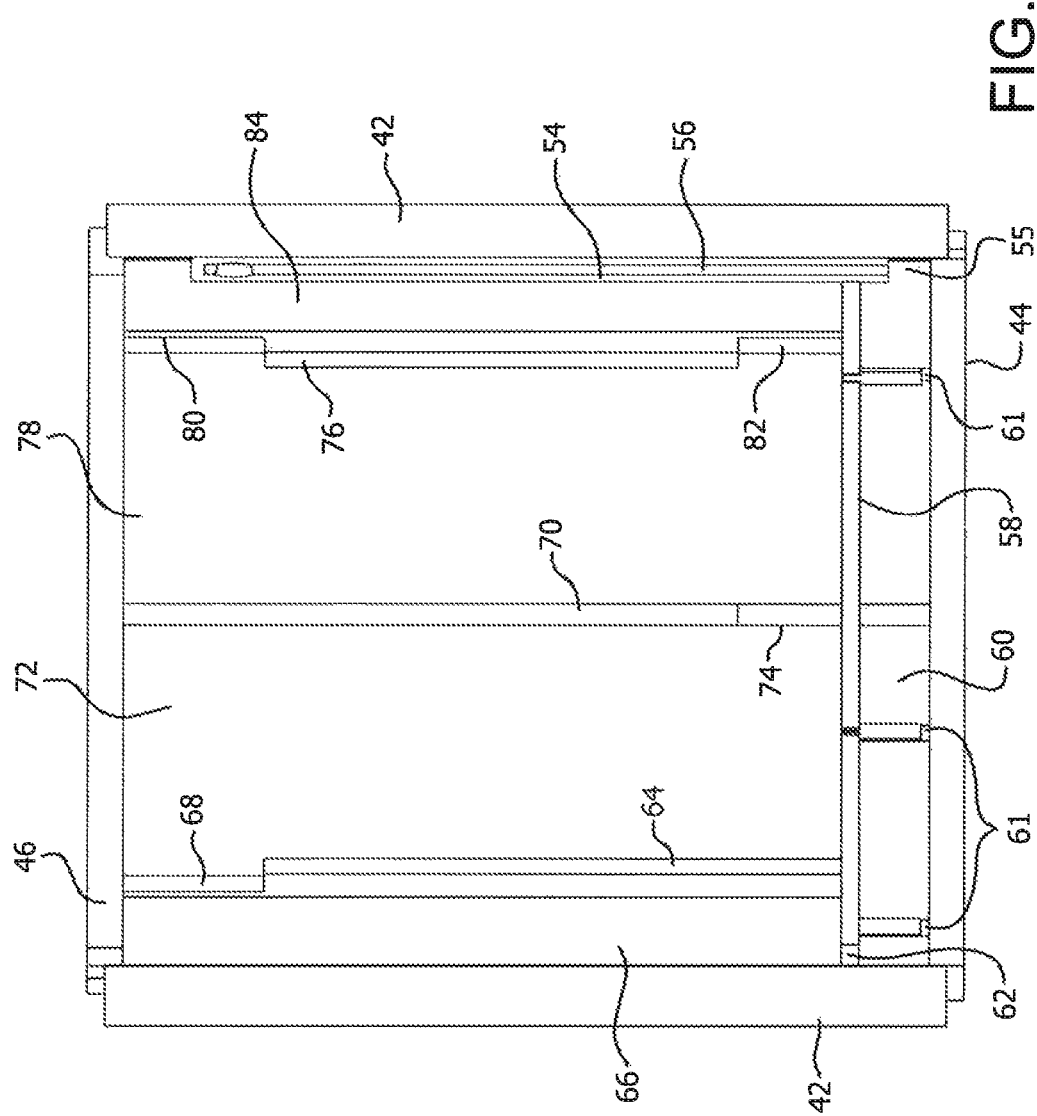
FIG. 7 is a top view of the evaporator shown in FIG. 4.

The evaporator cuff 20 includes a hose connector 28 and an evaporator body 30. The hose connector 28 is attached to and protrudes out from one side of the evaporator body 30. The connector 28 is preferably fixedly attached to the body, such as by welding, but could also be removably attached to the body through other conventional means, such as threads. The coaxial hose 22 is attach to the connector 28, preferably through a removable connection, such as threads, a bayonet connection, or other connection capable of handling the pressures and temperatures inherent in the system. Referring to FIGS. 3 and 6, in an embodiment, the hose 22 includes a threaded end 32 that mates with threads on an opening on one side of the connector 28. The threading of the end 32 to the connector 28 provides a fluid path from the outer tube 26 to the return channel 34 in the connector 28 that extends from where the end 32 of the hose attaches to the connector 28, through the connector 28 to an exit port 36.

The inner tube 24 preferably does not attach to the connector 28. Instead, the inner tube preferably passes through a cavity 38 in the connector 28 and out through an entry port 37 formed in the connector 28. It is also contemplated that the inner tube 24 could connect to or terminate within the cavity if desired.

The evaporator body 30 has an inner wall 40, an outer wall 42, first and second side walls 44, 46, and first and second end walls 48, 50. The inner wall 40 preferably has a shape that defines a portion of a cylinder, such as semi-cylindrical, so as to permit the inner wall 40 to conform to or substantially mate with the outer wall of a pipe that the evaporator is to be used on. The radius of the inner wall 40 is at least two inches so as to be useful for pipes having a diameter of at least four inches. Of course, it should be readily apparent that the radius of the inner wall 40 can be larger if the intended pipe to be frozen has a larger diameter. The shape of the outer surface of the outer wall 42 is not critical since it is not configured to come into direct contact with the pipe. However, having an outer wall 42 that has a similar curvature to the inner wall 40 allows for more efficient circulation and cooling conduction.

A cavity or fluid chamber 52 is located between the inner wall 40, outer wall 42, first and second side walls 44, 46 and first and second end walls, 48, 50. As shown in the figures, the inner tube 24 and the outer tube 26 are in fluid communicate with the chamber 52. More particularly, the inner tube 26 preferably extends through the cavity 38 in the connector 28, out through the entry port 37 in the connector 28 and through an evaporator inlet 39 in evaporator body and into the chamber 52. Thus, liquid refrigerant passing through inner tube 24 can pass into the chamber 52. The exit port 36 on connector 28 is also in fluid communication with the chamber 52, and, in particular, with evaporator outlet 41. As such, fluid from the chamber 52 can flow out of the evaporator outlet and into the exit port 36, through the return channel 34 in the connector 28 and back into the outer tube 26. The chamber 52 is preferably designed to facilitate refrigerant flow through the chamber so as to minimize oil that may be contained in the refrigerant from becoming significantly trapped in the chamber.

The extension of the inner tube 24 into the chamber 52 allows liquid refrigerant under LOW pressure to enter the chamber 52 through the inner tube 24 of the evaporator. The inner tube acts as a metering device to spray the low pressure liquid refrigerant into the chamber 52, which is at low pressure. This causes the refrigerant to evaporate. As it does, it absorbs heat from the chamber 52 which, in turn, causes the evaporator to conduct heat from the pipe that it is connected to (and the water inside the pipe).

The refrigerant vapor in the chamber 52 is drawn back from the evaporator through the outer tube 26 by suction. The suction draws the vapor through the outlet 41 and port 36, the return chamber 34 and into the outer tube 26. The refrigerant vapor flows into the compressor 14, which raises the pressure of the vapor. The high pressure vapor passes through the condenser 16, in which the vapor is exposed to a large cooling surface area that allows heat in the vapor to be removed. The condenser cools the refrigerant to its condensation temperature, which releases its heat changing it back to its liquid phase at high pressure to complete the cycle. The heat is removed from the condensers by the fan 18.

Referring now to FIG. 6, in order to prevent the high pressure liquid refrigerant from flowing directing back into the return channel 34, the evaporator 30 includes a series of baffles to create a flow path through the chamber 52 for the refrigerant vapor to follow. Specifically, a first baffle 54 is formed between the inner wall 40 and the outer wall 42 and attaches to the end wall 48. The first baffle 54 creates a first conduit 56 from the evaporator inlet 39 in a direction away from the evaporator outlet 41 so that refrigerant entering the first conduit 56 cannot pass directly out of the evaporator outlet 41. The first baffle 54 extends to, but preferably stops short of the first side wall 44 so as to define a first opening 55. A second baffle 58 is formed inward from the side wall 44 and extends from the first baffle 54 toward but preferably just short of the second end wall 50. This forms a second conduit 60 that extends along the front of the evaporator so as to define a channel for the refrigerant to flow to the opposite side of the evaporator chamber 52 from where it entered. Intermediate walls with notches 61 may be incorporated to control flow of the refrigerant.

A second opening 62 is formed between the end of the second baffle 58 and the second end wall 50 thereby providing a passage for the refrigerant gas to flow through. Alternatively, the second baffle 58 could extend to the second end wall and the second opening 62 can be a notch or cutout formed in the second baffle 58 near the second end wall 50.

A third baffle 64 is formed in the chamber 52 and extends preferably parallel to and spaced apart from the second end wall 50 so as to define a third conduit 66 for the refrigerant to flow along. The third baffle 64 extends from the second baffle 58 toward the second side wall 46. The third baffle either stops short of the second side wall 46 or is notched or otherwise cut so as to form a third opening 68 for the refrigerant to flow through.

A fourth baffle 70 is formed in the chamber 52 and extends preferably parallel to and spaced apart from the third baffle 64 so as to define a fourth conduit 72 for the refrigerant to flow along. The fourth baffle 70 extends from the second side wall 46 toward the second baffle 58. The fourth baffle 70 either stops short of the second baffle 58 or is notched or otherwise cut so as to form a fourth opening 74 for the refrigerant to flow through.

A fifth baffle 76 is formed in the chamber 52 and extends preferably parallel to and spaced apart from the fourth baffle 70 so as to define a fifth conduit 78 for the refrigerant to flow along. The fifth baffle 76 preferably extends from the second baffle 58 toward the second side wall 46. The fifth baffle 76 either stops short of the second side wall 46 or is notched or otherwise cut so as to form a fifth opening 80 for the refrigerant to flow through. In the illustrated embodiment, a sixth opening 82 is formed in the fifth baffle at or near the second baffle 58 so as to define a further opening for the refrigerant to flow through.

The fifth baffle 76 is also spaced apart from the first baffle 54 so as to define a sixth conduit 84 for the refrigerant to flow along. As discussed above, the evaporator outlet 41 is formed in the outer wall 42 and is aligned with the exit port 36 on the connector. The evaporator outlet 41 communicates with the sixth conduit so as to provide an opening through which the refrigerant can flow out of the chamber 52 and into the return channel 34 in the connector 28.

As shown, the baffles in the evaporator 52 define a continuous serpentine path for the refrigerant to flow along. The serpentine path provides an efficient system for heat transfer so as to cover the entire evaporator. While the illustrated embodiment uses six baffles, more or less baffles can be used so long as the refrigerant flows continuously through the evaporator.

As described above, the inner wall 40 preferably has a shape that defines a portion of a cylinder, such as semi-cylindrical. As such, to provide complete freezing, a second evaporator cuff would be placed on the opposite side of the pipe so as to cover the majority of the circumference. The two evaporator cuffs can be removably attached to the pipe, such as by a strap or bolts.

The inventor has determined that the current configuration of the pipe freezing apparatus is capable for producing a refrigerant temperature of −70 degrees F. or lower using conventional refrigerant, such as R-507 (sold by Honeywell) or R-404A (sold by DuPont), which is considerably below the required temperature of −55 degrees F. for producing an ice plug in a large diameter pipe, e.g., having a diameter of four inches or more.

As discussed above, the present invention contemplates that there would be two evaporator cuffs used to create an ice plug inside a diameter of pipe. During testing, it was determined that, as a result of fluid flow factors associated with the refrigerant exiting the condenser 12 and entering the two capillary tubes 24, including turbulence and pressure head, a temperature differential could develop between the two evaporator cuffs 20 due to supply of uneven amounts of refrigerant. This can be problematic since it could lead to inconsistent freezing and, thus, might not yield a complete ice plug in the pipe.

For example, in certain freezer units, it is necessary to achieve a design evaporator temperature of approximately 80° F. This is an extremely low temperature and difficult to obtain. The present invention is designed to reach that temperature through the innovative system described above. However, temperature losses as the refrigerant is channeled to the evaporator cuffs can result in a variation from this temperature. Testing has shown temperature differentials can be as much as 10° F. (i.e., one evaporator cuff at −80° F. and the other at −70° F.) or more. To minimize temperature losses, the present invention includes copper intake capillary tubes 24 which provide for minimal permeation. Even with that change, there can be unevenness in evaporator cuff temperatures.

Referring to FIGS. 8-11, to address this problem, the present invention includes a flow distributor 100 for controlling refrigerant flow to the evaporator cuffs by separation of the refrigerant flow into the two (or more) capillary tubes 24. The flow distributor 100 is preferably located downstream from the condenser 12 (or if there is a filter drier, downstream from that) at the intake capillary tubes 24.

Figure 11:
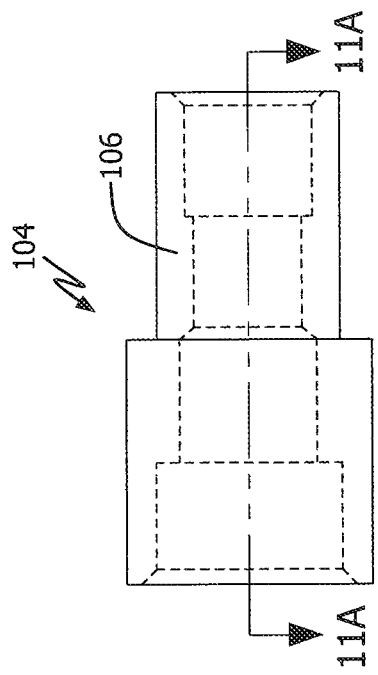
FIG. 11 is a side view of the intake section of the flow distributor of FIG. 8.
Figure 11A:
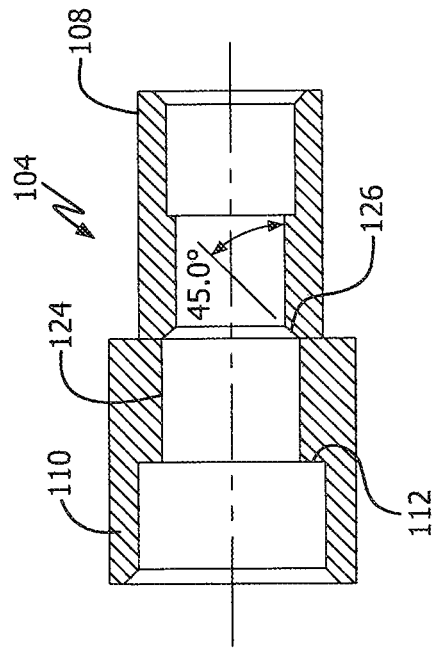
FIG. 11A is cross-sectional view of the intake section taken along lines 11A-11A in FIG. 11.

The flow distributor device 100 is preferably a two piece device that includes a flow divider section 102 and an intake section 104. The intake section 104 (shown in FIGS. 11 and 11A), includes a housing 106 with a first end 108 that is configured to attach to an output of the condenser or filter drier, and a second end 110 designed to mate with or connect to the divider section 102 as shown in FIG. 9A. A land 112 is located inside the housing 106 between the first and second ends 108, 110.

Figure 10:
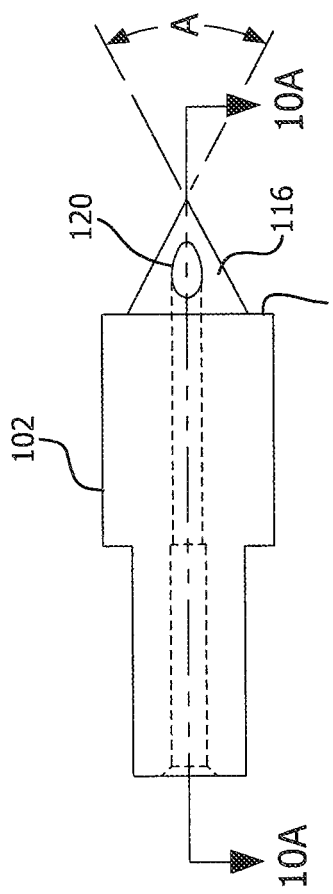
FIG. 10 is a side view of the diverter section of the flow distributor of FIG. 8.
Figure 10A:
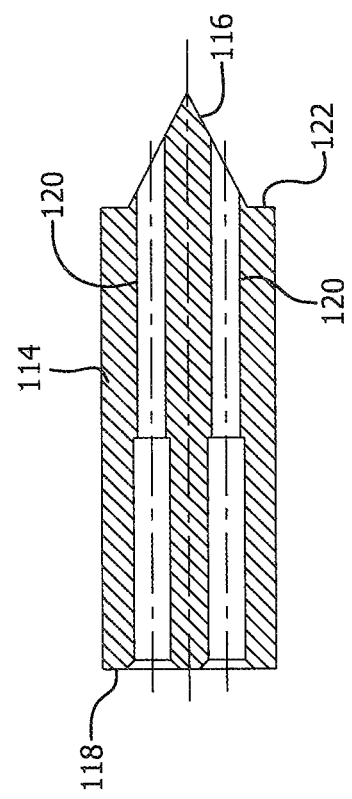
FIG. 10A is cross-sectional view of the diverter section taken along lines 10A-10A in FIG. 10.

The flow divider 102 is shown in FIGS. 10 and 10A and includes a housing 114 with a dividing end 116 and an output end 118. At least two channels 120 extend from the dividing end 116 to the output end 118. The channels 120 are preferably substantially identical in diameter to one another and symmetrically located in the housing 114. The channels 120 are also preferably similar in diameter to the capillary tubes 24. The channels 120 provide conduits for directing refrigerant from the dividing end through the housing 114 and out the output end 118.

The dividing end includes a protruding surface configured to separate the refrigerant flow into two (or more) fluid streams. In the illustrated embodiment, the dividing end has a conical or cone-shaped surface that forms an angle A of between about 20 degrees and about 60 degrees. In one embodiment, angle A is about 55 degrees. However it should be readily apparent that other angles can be used. Also, the surface need not be a conical surface, but could be any curved shape that will channel the refrigerant flow, including parabolic, complex, etc. It is also contemplated that the dividing end may, instead, be wedge-shaped with opposed sloped surfaces. The channels 120 have an open end that is positioned along the curved or sloped surfaces of the dividing end 116. The shape of the dividing end is designed to help reduce turbulence at the entrance of the channels 120.

On the outlet end 118, the channels 120 are configured to receive or attach to the capillary tubes 24 so as to provide a smooth flow of the refrigerant from the channels 120 into tubes 24.

The divider section 102 preferably includes a flange 122 formed on the housing adjacent to the curved or sloped surface 116 which is configured to seat on the land 112 in the intake section 104 as shown in FIG. 9A so as to position the dividing end 116 within the interior of the housing 106. As should be apparent, the tip of the dividing end 116 and the inner wall 124 of the intake housing 106 will cause the refrigerant to separate into distinct flow portions that are then directed by the intake housing 106 and the dividing end 116 into the channels 120, thus minimizing turbulence.

A sloped surface 126 can be machined into the inner wall 124 near the tip of the dividing end 116 in order to further facilitate the separation of the flow. In the illustrated embodiment the sloped surface has a conical shape with an angle of about 45 degrees. However other shapes and angles can be used.

The flow distributor 100 provides a unique mechanism for accurately separating the refrigerant flow into distinct flow portions and to reduce turbulence, thereby minimizing temperature differentials between refrigerant flows entering the evaporator cuffs. Testing has determined that the use of the flow distributor 100 reduced temperature differentials to less than 2° F.

The present invention may be embodied in other specific forms without departing from the spirit or essential attributes thereof and, accordingly, reference Should be made to the appended claims, rather than to the foregoing specification, as indicating the scope of the invention.

The invention claimed is:

1. An evaporator cuff for use with a pipe freezer apparatus, the evaporator cuff comprising:
a hose connector with a first cavity and a return channel;
an evaporator body attached to the hose connector, the evaporator body including an inner wall having a contour that defines a portion of a cylinder and configured to engage the outer surface of a pipe, an outer wall spaced apart from the inner wall, first and second side walls connecting the outer wall to the inner wall, and first and second end walls connecting the outer wall to the inner wall, a chamber is defined between the inner wall, outer wall, first and second side walls, and first and second end walls, an evaporator inlet is formed in the evaporator body and is in fluid communication with the first cavity of the hose connector, and an evaporator outlet is formed in the evaporator body and is in fluid communication with the return channel of the hose connector; and
a plurality of baffles are located in the chamber and arranged to define a series of conduits for creating a flow path through the chamber for refrigerant to flow along, the walls arranged so as to form a serpentine flow path from the evaporator inlet to the evaporator outlet,
wherein the plurality of baffles includes:
a first baffle formed between the inner wall and the outer wall and attached to the end wall, the first baffle creating a first conduit from the evaporator inlet in a direction away from the evaporator outlet so as to inhibit refrigerant entering the first conduit from passing directly into the evaporator outlet, the first baffle extending toward the first side wall and defining a first opening for providing a passage for refrigerant to flow out of the first conduit;
a second baffle located inward from the first side wall and extending from the first baffle the second end wall, the second baffle defining a second conduit that extends along the front of the evaporator to the opposite side of the evaporator chamber from the evaporator inlet, the second baffle defining a second opening for providing a passage for refrigerant to flow out of the second conduit; and
a third baffle located inward from the second end wall and extending away from the second baffle and toward the second side wall so as to define a third conduit, the third baffle defines a third opening for providing a passage for refrigerant to flow out of the third conduit.

2. The evaporator cuff of claim 1 wherein the plurality of baffles includes
a fourth baffle located in the chamber and spaced apart from the third baffle so as to define a fourth conduit, the fourth baffle extending from the second side wall toward the second baffle, the fourth baffle defining a fourth opening for providing a passage for refrigerant to flow out of the fourth conduit; and
a fifth baffle located in the chamber and spaced apart from the fourth baffle so as to define a fifth conduit, the fifth baffle extending from the second baffle toward the second side wall, the fifth baffle defining a fifth opening for providing a passage for refrigerant to flow out of the fifth conduit.

3. The evaporator cuff of claim 2 wherein the fifth baffle defines a sixth opening at or near the second baffle for providing a passage for refrigerant to flow out of the fifth conduit and toward the evaporator outlet.

4. The evaporator cuff of claim 3 wherein the fifth baffle is spaced apart from the first baffle so as to define a sixth conduit for the refrigerant to flow from the sixth opening toward the evaporator outlet.

5. A pipe freezer apparatus comprising:
at least one evaporator cuff according to claim 1;
a condenser/compressor unit; and
at least two fluid conduits connectable to the evaporator cuff and the condenser/compressor unit, one of the fluid conduits configured to channel cooled refrigerant to the evaporator cuff from the condenser/compressor unit and another of the fluid conduits configured to channel warmed refrigerant to the condenser/compressor unit.

6. The pipe freezer apparatus of claim 5 wherein the fluid conduits are disposed coaxially.

7. The pipe freezer apparatus of claim 5 wherein there are at least two evaporator cuffs, each evaporator cuff having an associated fluid conduit that is configured to channel cooled refrigerant to that evaporator cuff, the apparatus further comprising a flow distributor connected to the two conduits that are configured to channel cooled refrigerant to the two evaporator cuffs, the flow distributor connected to the condenser/compressor unit for receiving a single flow of refrigerant, the flow distributor including a divider for separating the single flow of refrigerant into multiple flow portions, and directing at least one of the refrigerant flow portions to each conduit.

8. The pipe freezer apparatus of claim 7 wherein the flow distributor includes an intake section that is attached to an output from the condenser/compressor unit and includes an interior chamber, and a divider section that is mounted to the intake section and that includes a protruding surface located within the chamber of the intake section, at least two channels extend through the divider section from the protruding surface to an outlet side, the protruding surface configured to divide the refrigerant flow and, in combination with an inner wall of the intake section, direct the refrigerant flow to the channels.

9. The pipe freezer apparatus of claim 8 wherein protruding surface is conical in shape.

10. An evaporator cuff for use with a condenser/compressor unit in a pipe freezer apparatus, the evaporator cuff comprising:
  an evaporator body adapted to connect to the condenser/compressor unit through a flexible hose, the evaporator body including an inner wall having a contour that defines a portion of a cylinder and configured to engage the outer surface of a pipe, an outer wall spaced apart from the inner wall, first and second side walls connecting the outer wall to the inner wall, and first and second end walls connecting the outer wall to the inner wall, a chamber is defined between the inner wall, outer wall, first and second side walls, and first and second end walls, an evaporator inlet is formed in the evaporator body and is configured to be connected to the condenser/compressor unit for receiving a flow of refrigerant, and an evaporator outlet is formed in the evaporator body and is configured to be connected to the condenser/compressor unit for directing a flow of refrigerant thereto; and
  a plurality of baffles are located in the chamber and arranged to define a series of conduits for creating a flow path through the chamber for refrigerant to flow along, the walls arranged so as to form a serpentine flow path from the evaporator inlet to the evaporator outlet, the plurality of baffles including:
    a first baffle formed between the inner wall and the outer wall and attached to the end wall, the first baffle creating a first conduit from the evaporator inlet in a direction away from the evaporator outlet so as to inhibit refrigerant entering the first conduit from passing directly into the evaporator outlet, the first baffle extending toward the first side wall and defining a first opening for providing a passage for refrigerant to flow out of the first conduit,
    a second baffle located inward from the first side wall and extending from the first baffle the second end wall, the second baffle defining a second conduit that extends along the front of the evaporator to the opposite side of the evaporator chamber from the evaporator inlet, the second baffle defining a second opening for providing a passage for refrigerant to flow out of the second conduit, and
    a third baffle located inward from the second end wall and extending away from the second baffle and toward the second side wall so as to define a third conduit, the third baffle defines a third opening for providing a passage for refrigerant to flow out of the third conduit.

11. The evaporator cuff of claim 10 wherein the plurality of baffles includes
  a fourth baffle located in the chamber and spaced apart from the third baffle so as to define a fourth conduit, the fourth baffle extending from the second side wall toward the second baffle, the fourth baffle defining a fourth opening for providing a passage for refrigerant to flow out of the fourth conduit; and
  a fifth baffle located in the chamber and spaced apart from the fourth baffle so as to define a fifth conduit, the fifth baffle extending from the second baffle toward the second side wall, the fifth baffle defining a fifth opening for providing a passage for refrigerant to flow out of the fifth conduit.

12. The evaporator cuff of claim 11 wherein the fifth baffle defines a sixth opening at or near the second baffle for providing a passage for refrigerant to flow out of the fifth conduit and toward the evaporator outlet.

13. The evaporator cuff of claim 12 wherein the fifth baffle is spaced apart from the first baffle so as to define a sixth conduit for the refrigerant to flow from the sixth opening toward the evaporator outlet.

* * * * *